May 21, 1929.  F. C. BLANCHARD  1,713,640
CONDUIT STRUCTURE
Filed June 16, 1926
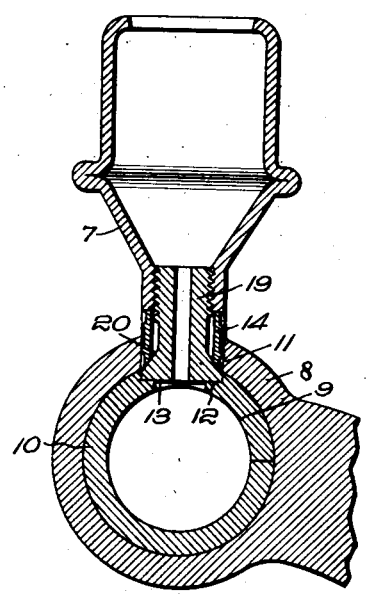
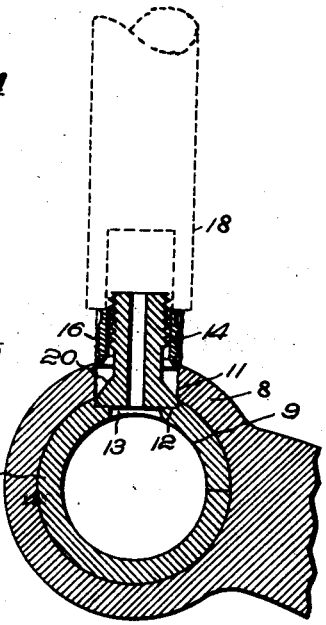
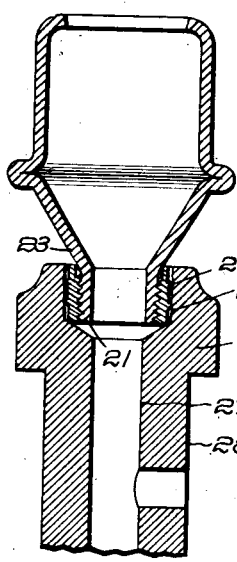
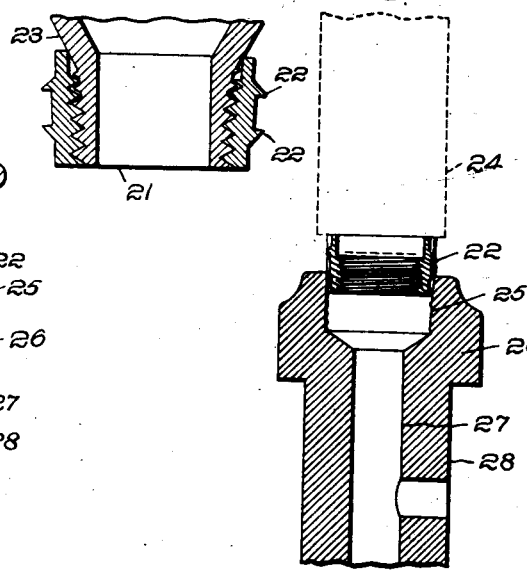
Inventor:
Frederick C. Blanchard Patented May 21, 1929.

1,713,640

UNITED STATES PATENT OFFICE.

FREDERICK C. BLANCHARD, OF DORCHESTER, MASSACHUSETTS.

CONDUIT STRUCTURE.

Application filed June 16, 1926. Serial No. 116,376.

This invention relates to a conduit structure having novel means for securing two hollow bodies together, and for affording a communication between them.

The invention will be best understood by reference to the following description, when taken in connection with the accompanying drawings of two specific embodiments thereof, while its scope will be more particularly pointed out in the appended claim.

In the drawings:

Fig. 1 is a vertical, sectional view of a conduit structure exemplifying the invention;

Fig. 2 is a vertical, sectional view illustrating the method of assembling the same;

Fig. 3 is an elevation of a knurled bushing which forms a part of the structure;

Fig. 4 is a sectional view on line 4—4 of Fig. 3;

Fig. 5 is a vertical, sectional view of a modification of the conduit structure;

Fig. 5A is a much enlarged sectional view illustrating the screw thread shown in Fig. 5; and Fig. 6 is a vertical, sectional view illustrating the method of assembling the conduit structure illustrated in Fig. 5.

Referring to the drawings, and to the embodiment of my invention which is illustrated in Figs. 1 to 4, inclusive, the conduit structure herein selected for exemplification comprises two hollow bodies, herein an oil cup 7 and a part 8 having a bearing surface 9 to be lubricated, said bearing surface in the present example being presented by a bushing 10. The part 8 and its bushing 10 present an opening 11, and at the lower end of the latter a seat 12. From this opening, a short passage 13 of less diameter leads to the bearing surface 9.

In practice, the parts 8 and 10 are usually made of steel, heat-treated to withstand shock and wear, as in the case of motor chassis parts. This being so, it is impossible, in adapting an oil cup to the bearing, to tap the opening 11 to receive a threaded nipple presented by an oil cup. In cars such as the Ford motor car, the oil cup illustrated in the drawing can be adapted to the bearing by the structure now to be described.

A metal bushing 14 (see Fig. 3), usually of soft, machine steel, is suitably knurled on its external surface to present a roughened surface, whose diameter, before it is inserted in place, is somewhat larger (usually .015 of an inch) than the opening which it is to occupy. As a matter of fact, owing to the knurling, the opening may vary several thousandths of an inch in diameter, without materially affecting the holding power of the knurling. In the present example, the knurling is characterized by two sets of V-shaped, helical grooves 15, one set being a right-hand helix and the other a left-hand helix, so that they intersect, as shown in Fig. 3. The effect of knurling the surface is to throw up burrs 16, along the margins of the grooves (see Fig 4). Preferably, the bushing is provided with an unknurled, or plain, cylindrical portion 17, whose diameter is such that it readily enters the opening 11, without pressure, whereas a very considerable amount of pressure is required to force the knurled part into the opening. In fact, the insertion of the bushing in practice as accomplished as illustrated in Fig. 2, by the use of a set 18, upon which great pressure must be exerted to force the bushing into place.

While in practice it is found that the mere insertion of the knurled bushing under pressure causes the bushing to be held quite firmly in place, even greater holding power is obtained by the use of means to expand the bushing after it is in place. In this embodiment of the invention, the expansion of the bushing is conveniently accomplished by a hollow body 19, presenting at its inner end a tapered surface 20 for engagement with the internal surface of the inner end of the bushing, the other end of the body having screw-threaded engagement with the oil cup 7, whereby rotation of the latter in the proper direction causes first an endwise engagement of the lower end of the oil cup with the upper end of the bushing, and then an upward or outward movement of the body 19, thus causing the tapered surface 20 to expand the inner end of the bushing 14.

In thus expanding the bushing, the knurled surface of the latter has so firm an engagement with the opening 11, that turning movement of the bushing does not take place during the expansion of the same by the rotation of the oil cup. The parts of the resulting structure are so firmly connected that, while the oil cup may be removed by unscrewing the same, yet the holding power of the attaching means is so great that the bushing will not slip, no matter how much force is applied in screwing the cup down into place. In fact, the cup will become deformed and destroyed before the bushing will slip. Indeed, the same is true of any lateral blow against the cup, which is a rather remarkable fact, when it is considered that the part in which the bushing is seated is made of hardened steel. It may be that one of the contributing causes is the fact that, when the opening 11 is machined, tiny circumferential lines are formed on its surface. These lines, almost invisible to the naked eye, are considerably exaggerated in Figs. 1 and 2, and show as a slightly wavy line. It is not known to a certainty whether this actually affects the result, but the fact remains that the mode of attachment of the oil cup to the part to be lubricated is such that accidental disengagement is impossible.

In the form of the invention illustrated in Figs. 5 and 6, a similar construction is employed, but instead of employing the separate tapered body 19 for causing the expansion of the bushing, the oil cup presents an externally threaded nipple 21, the thread of which is cut by an ordinary die having a tapered entrance, as a result of which the threads near the upper end of the nipple are shallower, and have the effect of a tapered surface. The oil cup also presents a tapered surface 23 above the threaded nipple. In this case, the bushing is driven into place, by means of a set 24, into an opening 25 provided in a part 26, having a passage 27 leading to a bearing surface 28. After the bushing has been driven into place, the oil cup is screwed into the bushing, and the taper presented by the threaded nipple 21 expands the bushing, which is further expanded by the tapered surface of the opening 25.

Having thus described two embodiments of my invention, but without limiting myself thereto, what I claim and desire by Letters Patent to secure is:

A conduit structure comprising, in combination, two hollow bodies one of which is provided with an opening, and means securing said bodies together, said means including a third hollow body having an externally knurled surface engaging the internal surface of said opening, and a fourth hollow body presenting a tapered surface seated against the third mentioned hollow body, the fourth-mentioned hollow body having screw-threaded engagement with one of the first mentioned hollow bodies to cause the seating of said tapered surface to expand said externally knurled surface against said internal surface.

In testimony whereof, I have signed my name to this specification.

FREDERICK C. BLANCHARD.